[19] United States Patent
Udagawa et al.

[11] Patent Number: 4,809,653
[45] Date of Patent: Mar. 7, 1989

[54] STEEL LAMINATE TYPE CYLINDER HEAD GASKET

[75] Inventors: Tsunekazu Udagawa, Ichikawa; Yoshio Yamada, Koshigaya, both of Japan

[73] Assignee: Ishikawa Gasket Co., Ltd., Tokyo, Japan

[21] Appl. No.: 69,671

[22] Filed: Jul. 6, 1987

[51] Int. Cl.$^4$ .................. F02F 11/00; F16J 15/08
[52] U.S. Cl. .................. 123/193 CH; 277/235 B
[58] Field of Search ............ 123/193 CH, 41.74, 273; 277/235 B, 207 R, 213

[56] References Cited

U.S. PATENT DOCUMENTS 3,843,141 10/1974 Kuhn .................. 123/193 CH

FOREIGN PATENT DOCUMENTS 0210315 12/1983 Japan .................. 123/193 CH
0090745 5/1984 Japan .................. 277/235 B Primary Examiner—Willis R. Wolfe
Assistant Examiner—M. Macy
Attorney, Agent, or Firm—Frank J. Jordan; C. Bruce Hamburg; Manabu Kanesaka

[57] ABSTRACT

A steel laminate type cylinder head gasket is installed in an engine with an auxiliary combustion chamber. The gasket comprises a first plate and at least one second plate situated adjacent to the first plate. The first plate is provided with at least one curved first bead situated adjacent to and at a predetermined distance away from a curved outer line corresponding to a part of a contour of a mouth plate situated above the gasket, a second bead situated adjacent to and at a predetermined distance away from an inner line corresponding to a part of a contour of a cylinder bore, and a plurality of third beads disposed at a predetermined distance away from each other. The second bead intercrosses the first bead. The third beads are arranged so that the third beads are in order situated away from the inner line and intercept the first bead.

13 Claims, 2 Drawing Sheets

STEEL LAMINATE TYPE CYLINDER HEAD GASKET

BACKGROUND OF THE INVENTION AND RELATED ART STATEMENT

The present invention relates to a steel laminate type cylinder head gasket for an internal combustion engine with an auxiliary combustion chamber.

An engine with an auxiliary combustion chamber is known, which comprises, as shown in FIG. 1, a cylinder block J having at least one cylinder bore Hc, a cylinder head H having a depression K, and a mouth plate L attached to the cylinder head H to cover the depression K for constituting an auxiliary combustion chamber M. A gasket 10 is installed between the cylinder head H and the cylinder block J. As a result, the gasket 10 supports a part N of the mouth plate L (FIG. 2). Namely, the part N of the mouth plate L is located on and supported by the gasket 10.

When the mouth plate L is installed in the cylinder head H, a lower surface of the cylinder head H must be precisely flush with a lower surface of the mouth plate L. Otherwise, sealing around the cylinder bore Hc of the cylinder block J can not be securely made.

Actually, it is very difficult to prepare the cylinder head H and the mouth plate L so that the lower surfaces thereof are flush with each other. Generally, the lower surface of the mouth plate L slightly projects dents from the lower surface of the cylinder head H. Moreover, even if the lower surfaces of the cylinder head H and the mouth plate L are flush with each other when the mouth plate L is installed in the cylinder head H, in case the engine is operated, the lower surfaces of the cylinder head H and the mouth plate L do not become flush with each other due to heat of the engine.

Under the circumstances, unless a gasket situated between the cylinder head H and the cylinder block J can provide sufficient elasticity in any situation, sealing around the cylinder head H, cylinder block J and mouth plate L can not be properly made. However, since a conventional steel laminate gasket 10 as shown in FIG. 1 is formed of a plurality of steel plates and a wire ring, the steel laminate gasket 10 can not provide sufficient elasticity to properly seal around the cylinder bore. Therefore, it was desired to provide a steel laminate gasket which can securely seal around the cylinder bore.

In view of the drawbacks of the conventional steel laminate gasket, an improved steel laminate gasket is proposed in Japanese patent application No. 57-199777 (published on May 25, 1984 as Publication No. 59-90745), wherein one of the plates forming a steel laminate gasket is provided with a plurality of projections or beads at an area P' corresponding to the part N of the mouth plate L. As shown in FIG. 3, beads 11 are concentrically arranged at the part P' of a plate 12.

The steel laminate gasket with the beads 11 as disclosed in Publication No. 59-90745 can properly seal around the cylinder bore Hc, as compared with a steel laminate gasket without beads. However, the steel laminate gasket with the beads 11 can not perfectly seal.

As a result of study, it was noticed that when the engine with the auxiliary combustion chamber is operated, the mouth plate L may move toward the auxiliary combustion chamber. In particular, the center of the mouth plate L dents deepest, and the dent becomes shallower as it goes toward the edge of the mouth plate L. This is because the mouth plate L separating the combustion chamber from the auxiliary combustion chamber is severely affected by heat and pressure changes from the combustion chamber. The steel laminate gasket with the beads 11 as disclosed in Publication No. 59-90745 could not properly absorb movement of the mouth plate L caused by the heat and pressure changes of the combustion chamber. Namely, the gasket with the beads 11 can seal a shallow portion of a dent but can not seal a deep portion thereof. Consequently, gas leakage may happen.

Accordingly, one object of the present invention is to provide a steel laminate gasket for an engine with an auxiliary combustion chamber, which can seal properly around the cylinder bore.

Another object of the present invention is to provide a steel laminate gasket as stated above, wherein different sealing pressure applied to the gasket can be properly absorbed.

A further object of the present invention is to provide a steel laminate gasket as stated above, wherein the gasket can be easily and economically manufactured.

Further objects and advantages of the invention will be apparent from the following description of the invention.

SUMMARY OF THE INVENTION

A steel laminate type cylinder head gasket of the present invention is installed in an internal combustion engine with an auxiliary combustion chamber. The engine comprises a cylinder block with a cylinder bore, a cylinder head situated above the cylinder block and having an auxiliary combustion chamber, and a mouth plate attached to the cylinder head for defining the auxiliary combustion chamber.

The gasket comprises a first plate having at least one first sealing area around a cylinder bore and at least one second sealing area adjacent the first sealing area on which the mouth plate is placed, and at least one second plate situated adjacent to the first plate to form the steel laminate gasket. The second sealing area is defined by a curved outer line corresponding to a part of a contour of the mouth plate and an inner line corresponding to a part of a contour of the cylinder bore.

The first plate is provided with at least one curved first bead situated adjacent to and at a predetermined distance away from the curved outer line, a second bead situated in the second sealing area adjacent to and at a predetermined distance away from the inner line, and a plurality of third beads disposed at a predetermined distance away from each other and situated in the second sealing area defined by the first and second beads. The second bead intercrosses the first bead. The third beads are arranged so that the third beads are in order situated away from the inner line and intercept the first bead.

The height of the third beads may decrease as the distance from the cylinder bore increases. The first plate may be provided with at least one curved fourth bead situated outside the first bead at a predetermined distance away from the first bead.

The second bead may extend beyond points intercepting the fourth bead and include outer ends, respectively. Further, the first plate may include two fifth beads. The fifth bead extends from the outer end of the second bead to a portion on the fourth bead so that a point where the second bead intercrosses the fourth bead is located inside the fifth bead. Consequently, the second sealing area can be securely sealed.

DETAILED DESCRIPTION OF PREFERRED EMBODIMENTS

Figure 1:
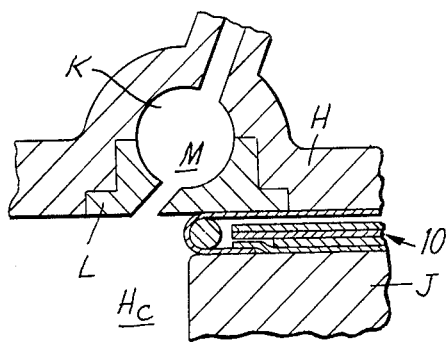
FIG. 1 is an explanatory section view of a conventional gasket installed in an engine with an auxiliary combustion chamber.
Figure 2:
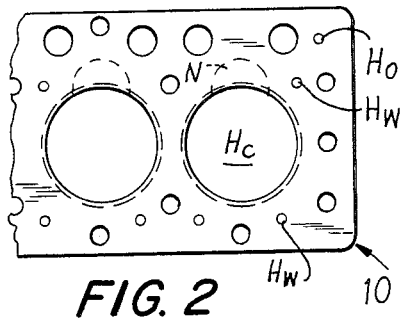
FIG. 2 is a plan view of a part of the conventional gasket.
Figure 3:
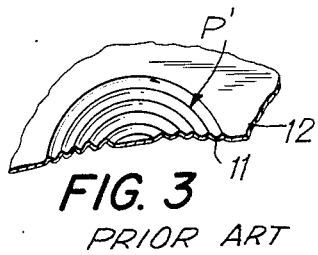
FIG. 3 is an explanatory perspective view of a part of a conventional steel plate.
Figure 4:
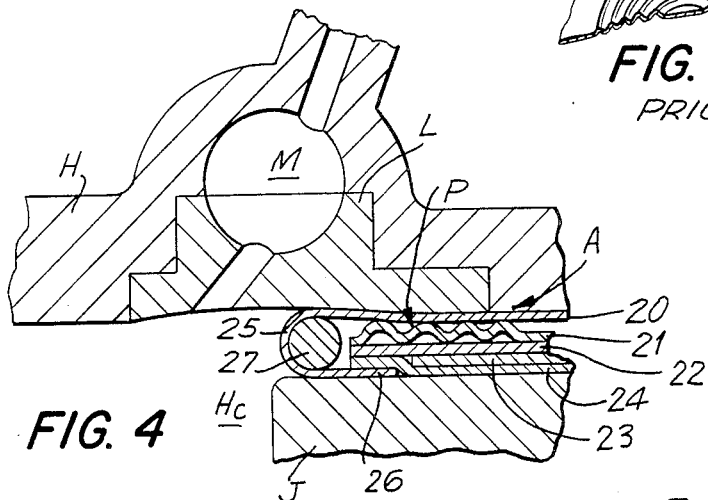
FIG. 4 is an explanatory section view of a first embodiment of a gasket of the present invention installed in an engine with an auxiliary combustion chamber.

Referring to FIG. 4, a first embodiment A of a steel laminate gasket of the invention is installed in an engine with an auxiliary combustion chamber. Namely, the gasket A is situated between the cylinder block J and the cylinder head H with the mouth plate L for forming the auxiliary combustion chamber M. The lower surface of the mouth plate L is shown to dent slightly toward the auxiliary combustion chamber M. The gasket A seals partly around the mouth plate L and entirely around the cylinder bore Hc on the cylinder block J.

The gasket A is provided with a plurality of cylinder bores Hc, water holes Hw, oil holes Ho and so on as in the conventional gasket 10. The gasket A comprises an upper plate 20, a lower plate 24 and three middle plates 21, 22, 23. The upper plate 20 is curved at a curved portion 25 adjacent the cylinder bore Hc and is turned so that a flange 26 is located outside the lower plate 24. A seal ring 27 is situated adjacent the curved portion 25. The curved portion 25 and the seal ring 27 substantially seal around the cylinder bore Hc.

Figure 5:
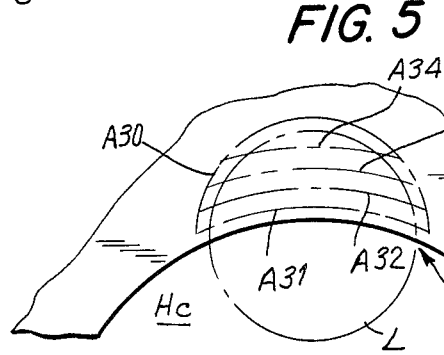
FIG. 5 is an explanatory plan view of a steel plate with beads of the first embodiment of the gasket of the invention.

As shown in FIG. 5, the middle plate 21 is provided with a plurality of beads at an area P on which a part of the mouth plate L is mounted. The beads formed on the middle plate 21 are a semicircular bead A30, and curved beads A31, A32, A33, A34. The semicircular bead A30 is located under the cylinder head H outside the area P where the mouth plate L is mounted. Outer ends of the curved beads A31, A32, A33, A34 intercross the semicircular bead A30. Namely, the beads A31, A32, A33, A34 extend over the edge between the mouth plate L and the cylinder head H, so that the beads A31-A34 securely seal therebetween.

The height of the bead A31 near the cylinder bore Hc is the highest, and the height of the beads becomes shorter in order as the distance from the cylinder bore Hc increases. As a result, even if the central portion of the mouth plate L deeply dents toward the auxiliary combustion chamber M in operation as shown in FIG. 4, the bead A31 can provide sufficient sealing pressure against the central portion of the mouth plate L. The beads A32-A34 cooperate with the bead A31 and seal around the mouth plate L.

In case the mouth plate L is not designed to dent deeply, the height of the beads A31-A34 may be the same. Similarly, the beads A30-A34 may be provided on the plates 20, 22, 23, 24 instead of the plate 21. Even if modified, the gasket A with the beads A30-A34 can properly seal around the cylinder bore.

Figure 6:
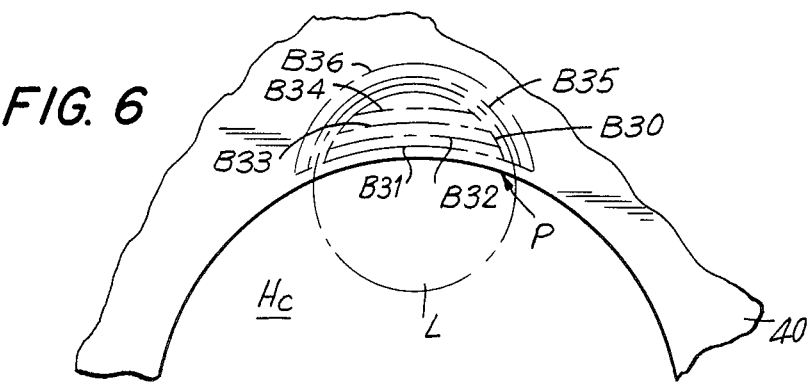
FIG. 6 is an explanatory plan view similar to FIG. 5, for showing a steel plate of a second embodiment of the invention.

FIG. 6 shows a second embodiment B of a steel laminate gasket of the present invention. The gasket B comprises the steel plates 20, 22, 23, 24 and the seal ring 27, as in the gasket A. The gasket B includes a steel plate 40 instead of the plate 21 in the gasket A.

The plate 40 is provided with semicircular beads B30, B35, B36, and curved beads B31, B32, B33, B34. The semicircular bead B30 is located inside the area P, while the semicircular beads B35, B36 are located outside the area P. The curved bead B31 extends over the area P and intercrosses the semicircular beads B30, B35, B36. The curved beads B32, B33, B34 are located inside the area P and intercept the bead B30.

In the gasket B, the beads B30-B34 provide sealing pressure at the area P, and the semicircular beads B35, B36 situated outside the area P seal around the area P.

Figure 7:
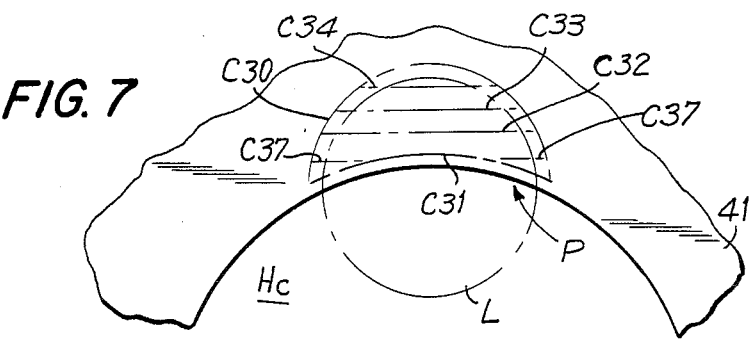
FIG. 7 is an explanatory plan view similar to FIG. 5, for showing a steel plate of a third embodiment of the invention.

FIG. 7 shows a third embodiment C of a steel laminate gasket of the present invention. The gasket C comprises the steel plates 20, 22, 23, 24 and the seal ring 27, as in the gasket A. The gasket C includes a steel plate 41 instead of the plate 21 in the gasket A.

The plate 41 is provided with a semicircular bead C30, a curved bead C31, linear beads C32, C33, C34, and auxiliary beads C37. The semicircular bead C30 is located outside the area P and intercrosses the curved bead C31. The linear beads C32, C33, C34 extend over the area P and intercept the semicircular bead C30. The auxiliary bead C37 extends parallel to the linear bead C32 and intercepts the curved bead C31 at an inner end and the semicircular bead C30 at an outer end thereof. The gasket C operates as in the gasket A.

Figure 8:
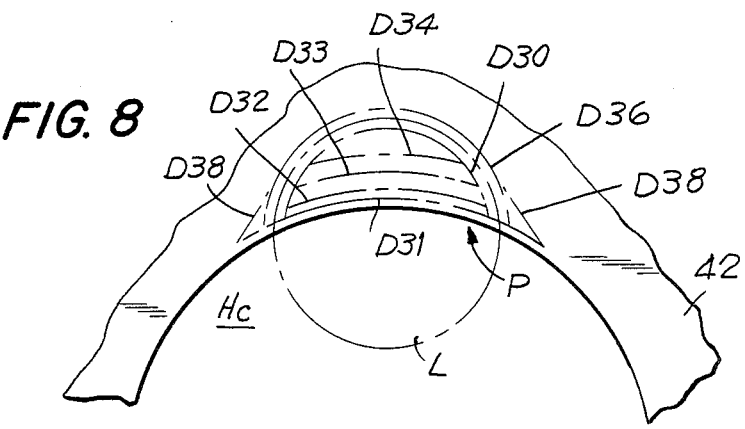
FIG. 8 is an explanatory plan view similar to FIG. 5, for showing a steel plate of a fourth embodiment of the invention.

FIG. 8 shows a fourth embodiment D of a steel laminate gasket of the present invention. The gasket D comprises the steel plates 20, 22, 23, 24 and the seal ring 27, as in the gasket A. The gasket D includes a steel plate 42 instead of the plate 21 in the gasket A.

The plate 42 is provided with semicircular beads D30, D36, curved beads D31, D32, D33, D34 and auxiliary beads D38. The semicircular bead D30 is located inside the area P, while the semicircular bead D36 is located outside the area P. The curved bead D31 intercrosses the semicircular beads D30, D36 and extends further outwardly, while the curved beads D32, D33, D34 intercept the semicircular bead D30.

The auxiliary bead D38 extends between an outer end of the bead D31 and a part of the semicircular bead D36 so that a point where the semicircular bead D30 intercepts the curved bead D31 is located adjacent the cylinder bore Hc relative to the auxiliary bead D38.

When an engine is operated, the mouth plate L may deform due to high pressure and heat. Especially, edge portions of the mouth plate L adjacent the cylinder bore Hc are exposed to high pressure and heat. Therefore, the bead for sealing this area is liable to deform to thereby cause leakage of a gas. The auxiliary bead D38 substantially prevents leakage at this area.

In the present invention, a plurality of beads are formed on and around the area P adjacent the mouth plate L, so that leakage around the mouth plate L is substantially prevented.

While the invention has been explained with reference to the specific embodiments of the invention, the explanation is illustrative and the invention is limited only by the appended claims.

What is claimed is:

1. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, comprising:
   a first plate having at least one first sealing area around the cylinder bore and at least one second sealing area adjacent the first sealing area, on which the mouth plate is placed, said second sealing area being defined by a curved outer line corresponding to a part of a contour of the mouth plate and an inner line corresponding to a part of a contour of the cylinder bore, said first plate having at least one curved first bead situated adjacent to and at a predetermined distance away from the curved outer line, a second bead situated in the second sealing area adjacent to and at a predetermined distance away from the inner line, said second bead intercrossing the first bead, and a plurality of third beads disposed at a predetermined distance away from each other and situated in the second sealing area defined by the first and second beads, said third beads being arranged so that the third beads are in order situated away from the inner line and intercept the first bead, and
   at least one second plate situated adjacent to the first plate to form the steel laminate gasket.

2. A steel laminate type cylinder head gasket according to claim 1, wherein said first bead is located outside the curved outer line so that the third beads extend over the curved outer line.

3. A steel laminate type cylinder head gasket according to claim 2, wherein height of the third beads decreases as distance from the cylinder bore increases.

4. A steel laminate type cylinder head gasket according to claim 3, wherein said third beads curve concentrically with the inner line.

5. A steel laminate type cylinder head gasket according to claim 3, wherein said third beads orient perpendicularly to a radial line of the cylinder bore passing through a center of the second sealing area.

6. A steel laminate type cylinder head gasket according to claim 1, further comprising at least one curved fourth bead situated outside the first bead and at a predetermined distance away from the first bead, said fourth bead intercrossing the second bead.

7. A steel laminate type cylinder head gasket according to claim 6, wherein said first bead is located inside the curved outer line and said fourth bead is located outside the curved outer line.

8. A steel laminate type cylinder head gasket according to claim 7, wherein said second bead extends beyond points intercepting the fourth bead and includes outer ends, respectively, said first plate further including two fifth beads, each fifth bead extending from the outer end of the second bead to a portion on the fourth bead so that a point where the second bead intercrosses the fourth bead is located inside the fifth bead, whereby the second sealing area can be securely sealed.

9. A steel laminate type cylinder head gasket according to claim 8, wherein height of the third beads decreases as distance from the cylinder bore increases.

10. A steel laminate type cylinder head gasket according to claim 9, further comprising a seal ring extending around the cylinder bore for sealing the first sealing area, said beads for sealing the second sealing area being located outside the seal ring.

11. A steel laminate type cylinder head gasket according to claim 10, further comprising an outer plate situated above the first plate and having a curved portion around the cylinder bore and a flange extending outwardly from the cylinder bore, said seal ring being situated between the outer plate and the flange and inside the curved portion.

12. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, said gasket having at least one first sealing area around the cylinder bore and at least one second sealing area adjacent the first sealing area, on which the mouth plate is placed, said second sealing area being defined by a curved outer line corresponding to a part of a contour of the mouth plate and an inner line corresponding to a part of a contour of the cylinder bore, comprising:
   a first plate having at least one curved first bead situated outside the curved outer line to be located adjacent to and at a predetermined distance away from the curved outer line, a second bead substantially situated in the second sealing area adjacent to and at a predetermined distance away from the inner line, said second bead intercrossing the first bead, and a plurality of third beads disposed at a predetermined distance away from each other and substantially situated in the second sealing area defined by the first and second beads, the height of the third beads decreasing as the distance from the cylinder bore increases, said third beads being arranged so that the third beads are in order situated away from the inner line, extend over the curved outer line and intercept the first bead; and
   at least one second plate situated adjacent to the first plate to form the steel laminate gasket.

13. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, said gasket having at least one first sealing area around the cylinder bore and at least one second sealing area adjacent the first sealing area, on which the mouth plate is placed, said second sealing area being defined by a curved outer line corresponding to a part of a contour of the mouth plate and an inner line corresponding to a part of a contour of the cylinder bore, comprising:
   a first plate having at least one curved first bead situated inside the curved outer line to be located adjacent to and at a predetermined distance away from the curved outer line, a second bead substantially situated in the second sealing area adjacent to and at a predetermined distance away from the inner line, said second bead intercrossing the first bead, a plurality of third beads disposed at a predetermined distance away from each other and situated in the second sealing area defined by the first and second beads, the height of the third beads decreasing as the distance from the cylinder bore increases, said third beads being arranged so that the third beads are in order situated away from the inner line and intercept the first bead, and at least one curved fourth bead situated outside the curved outer line and at a predetermined distance away from the curved outer line, said fourth bead intercrossing the second bead, and at least one second plate situated adjacent to the first plate for form the steel laminate gasket.

* * * * *